US008913300B2

(12) United States Patent
Hernandez Esteban

(10) Patent No.: US 8,913,300 B2
(45) Date of Patent: Dec. 16, 2014

(54) OCCLUSION OF VECTOR IMAGE DATA

(75) Inventor: Carlos Hernandez Esteban, Kirkland, WA (US)

(73) Assignee: Google Inc., Mountain View, CA (US)

(*) Notice: Subject to any disclaimer, the term of this patent is extended or adjusted under 35 U.S.C. 154(b) by 160 days.

(21) Appl. No.: 13/604,576

(22) Filed: Sep. 5, 2012

(65) Prior Publication Data

US 2013/0083015 A1    Apr. 4, 2013

Related U.S. Application Data

(60) Provisional application No. 61/543,272, filed on Oct. 4, 2011.

(51) Int. Cl.
*G06T 15/00* (2011.01)
*G06T 17/05* (2011.01)
*G06T 15/40* (2011.01)

(52) U.S. Cl.
CPC ............... *G06T 15/00* (2013.01); *G06T 17/05* (2013.01); *G06T 15/40* (2013.01)
USPC ........................................... 358/419

(58) Field of Classification Search
USPC .......................... 345/418, 424, 581, 582, 589
See application file for complete search history.

(56) References Cited

U.S. PATENT DOCUMENTS

| | | | |
|---|---|---|---|
| 2004/0257375 A1* | 12/2004 | Cowperthwaite | 345/582 |
| 2009/0210388 A1 | 8/2009 | Elson et al. | |
| 2010/0134491 A1* | 6/2010 | Borland et al. | 345/424 |
| 2011/0164109 A1* | 7/2011 | Baldridge et al. | 348/43 |

* cited by examiner

*Primary Examiner* — James A Thompson
(74) *Attorney, Agent, or Firm* — Lerner, David, Littenberg, Krumholz & Mentlik, LLP

(57) ABSTRACT

Systems and methods for rendering an image related to a target area is provided. Image data and an associated depth-map of the target area are received. Vector image data corresponding to the image data of the target area are further received. A height value for each of a plurality of pixels of the image data is determined based on the associated depthmap. A mask for the image data is created based on the determined height value for each of the plurality of pixels of the image data, and applied to the vector image data. An image of the target area comprising the received image data and the masked vector image data is rendered for display.

20 Claims, 7 Drawing Sheets

OCCLUSION OF VECTOR IMAGE DATA

CROSS-REFERENCES TO RELATED APPLICATIONS

The present application claims the benefit of U.S. Provisional Patent Application No. 61/543,272, entitled "Occlusion of Vector Image Data," filed on Oct. 4, 2011, which is hereby incorporated by reference in its entirety for all purposes.

BACKGROUND

The subject technology generally relates to rendering images used in mapping applications, and in particular, relates to systems and methods for rendering images that correspond to a map with selectively applied vector image data related to the map.

Certain mapping applications utilize images (e.g., satellite view images, oblique aerial view images, etc.) to provide additional perspectives and details through actual views of target areas of a map selected by a user. In order to provide mapping information (e.g., thoroughfares, thoroughfare labels, landmark labels, etc.) along with these images, vector image data may be rendered with the images. However, rendering raw vector image data onto an image that provides 3-dimensional (3D) information may produce aesthetically unpleasing results. For example, thoroughfares, such as roads, highways, trails, etc., and associated labels derived from vector image data may be laid across a physical structure that would otherwise occlude a view of the thoroughfare in the image. An operator may manually modify vector image data to remove them from being laid across physical structures and send the modification as extra information with the vector image data; however, such a process would require a more complex infrastructure and extra bandwidth for sending the information.

SUMMARY

According to one aspect of the subject technology, a computer-implemented method for rendering an image related to a target area is provided. The method includes receiving image data and an associated depthmap of the target area. The method further includes receiving vector image data corresponding to the image data of the target area. A height value for each of a plurality of pixels of the image data is determined based on the associated depthmap. A mask is created based on the determined height value for each of the plurality of pixels of the image data. The mask is applied to the vector image data and an image of the target area comprising the received image data and the mask vector image data is rendered for display.

According to another aspect of the subject technology, a machine-readable medium comprising instructions stored therein, which when executed by a system, cause the system to perform operations is provided. The operations include receiving an oblique view image of a target area and a depthmap associated with the oblique view image and receiving vector image data corresponding to the oblique view image, wherein the vector image data provides a graphical representation of thoroughfares. The operations further include determining a height value for each of a plurality of pixels of the oblique view image based on the associated depthmap and modifying the vector image data based on the determined height value by not displaying pixels from the vector image data corresponding to a set of pixels of the oblique view image determined to have a height value greater than a predetermined threshold value. The operations further include rendering, for display, an oblique view image of the target area comprising the received oblique view image and the modified vector image data.

According to another aspect of the subject technology, system for rendering an image related to a map with selectively applied vector image data. The system includes one or more processors and a machine-readable medium comprising instructions stored therein, which when executed by the processors, cause the processors to perform operations. The operations include receiving image data and an associated depthmap of a target area and vector image data corresponding to the image data of the target area. The operations further include determining a height value for each of a plurality of pixels of the image data based on the associated depthmap and modifying the vector image data based on the determined height value by omitting display of pixels of the vector image data corresponding to a set of pixels of the image data determined to have a height value greater than a predetermined threshold value. The operations further include overlaying the image data of the target area with the modified vector image data and providing for display of the image data with the overlaid modified vector image data.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

According to various aspects of the subject technology, a computer-implemented method for rendering an image related to a target area of a map is provided. According to the method, image data, an associated depthmap, and vector image data of the target area are received. Height values of the target area are determined based on the depthmap. A mask is created for the vector image data based on the determined height values of the target area and the mask is applied to the vector image data. A composite image is rendered that includes the map related image data along with the masked vector image data.

Figure 1:
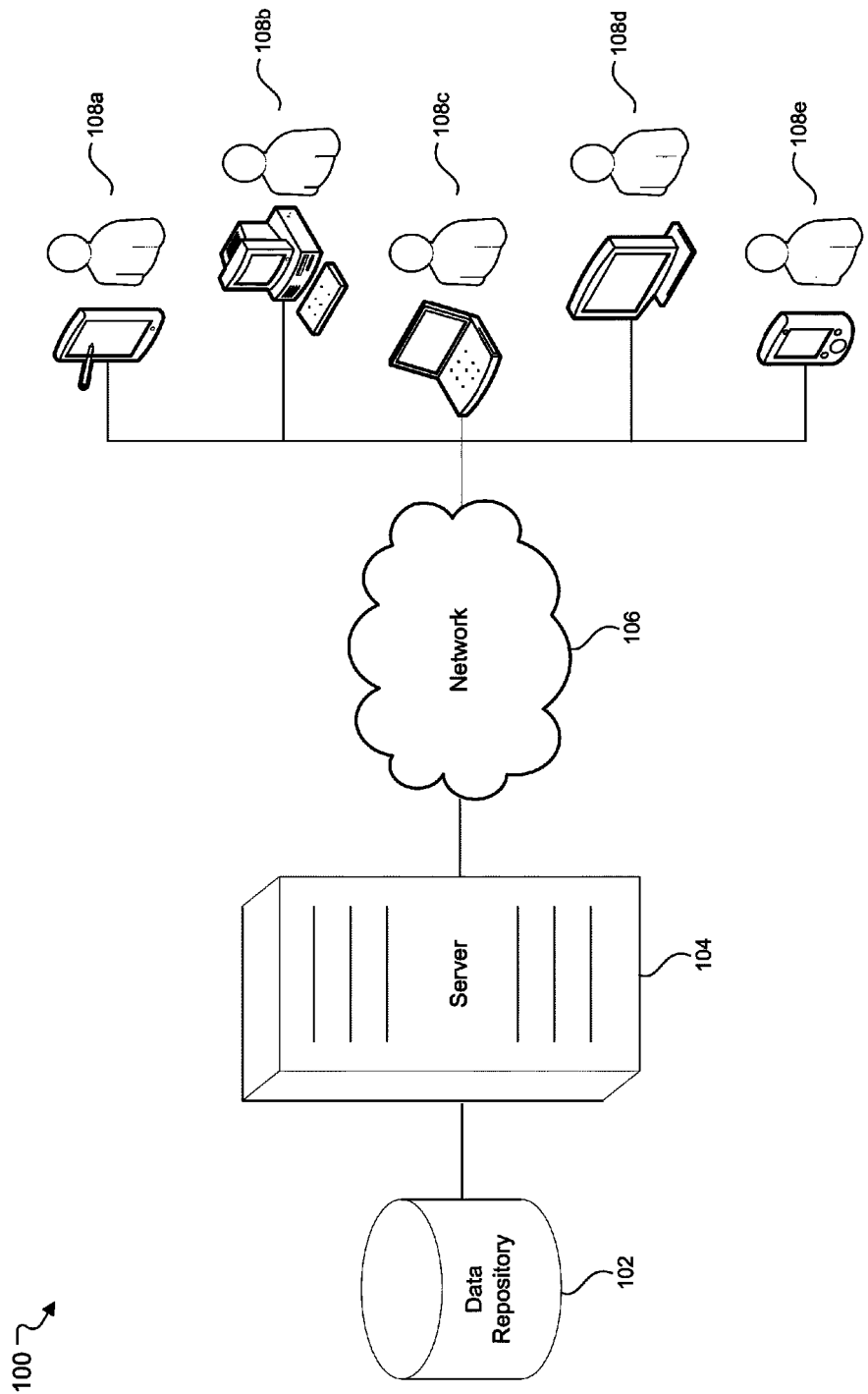
FIG. 1 illustrates an example of a system for retrieving/serving image data utilized to render map related images with selectively applied vector image data, in accordance with various aspects of the subject technology.

FIG. 1 illustrates an example of a system for retrieving/serving image data utilized to render map related images with selectively applied vector image data, in accordance with various aspects of the subject technology. Network environment 100 includes one or more data repositories 102 (e.g., computer-readable storage media) for storing images associated with target areas, depthmaps corresponding to the images, and vector image data corresponding to the images. The stored images may include images corresponding to a variety of different elevation orientations (e.g., nadir view, oblique aerial view, street view etc.) and a variety of different directional headings. The stored depthmaps are associated with images and are used to provide renderings of different viewing orientations (e.g., oblique aerial view images, street view images, etc.). The stored vector image data may be associated with images to provide renderings of objects onto the images (e.g., roads, labels, etc.).

The network environment 100 further includes server 104. While the network environment 100 includes a single server in FIG. 1, the network environment may include several interconnected servers in some implementations. Server 104 may receive requests from client devices 108a-108e. Server 104 and client devices 108a-108e may be communicatively coupled through a network 106. Client devices 108a-108e may request data from server 104. Upon receiving the request, server 104 may retrieve a set of associated images, depthmaps, and vector data from image data repository 102 and serve the set of associated images to client devices 108a-108e. In some implementations, client devices 108a-108e process the images provided from image data repository 102. In some implementations, certain processing may be performed on server 104, and the processed image information served to the client devices.

Client devices 108a-108e represent various forms of processing devices. Example processing devices can include a desktop computer, a laptop computer, a handheld computer, a television with one or more processors embedded or coupled thereto, a personal digital assistant (PDA), a network appliance, a camera, a smart phone, a media player, a navigation device, an email device, a game console, or a combination of any these data processing devices or other data processing devices.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with server 104 via a virtual private network (VPN), Secure Shell (SSH) tunnel, or other secure network connection. In some aspects, network 106 may further include a corporate network (e.g., intranet) and one or more wireless access points.

Figure 2:
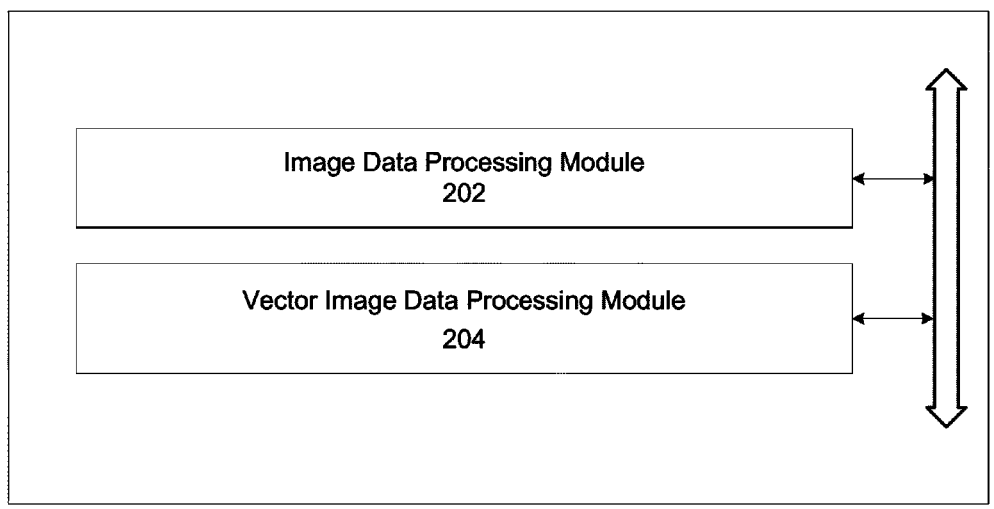
FIG. 2 illustrates an example of system for rendering map related images with selectively applied vector image data, in accordance with various aspects of the subject technology.

FIG. 2 illustrates an example of a system utilized for rendering an image related to a map with selectively applied vector image data, in accordance with various aspects of the subject technology. System 200 includes image data processing module 202 and vector image data processing module 204. These modules may be in communication with one another. In some implementations, the modules may be implemented in software (e.g., subroutines and code). The software implementation of the modules may operate on a client device 108 web browser to render the images. In some implementations, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

In one example, image data processing module 202 receives map related image data corresponding to a target area and processes the map related image data for display by combining the map related image data with vector image data. For a given target area of a map, image data processing module 202 may receive from server 104 images (e.g., oblique aerial view images) of the target area along with one or more depthmaps associated with the images. Vector image data processing module 204 may receive vector image data from server 104 associated with the target area. Vector image data processing module 204 utilizes the depthmaps to determine height values associated with objects in the image of the target area. Vector image data processing module 204 utilizes the determined height values to create a mask for the received vector image data (i.e., determine where occlusion of thoroughfares by physical structures in the target area may occur), and apply the mask to the vector image data. Image data processing module 202 may combine the masked vector image data with the received image to produce a final image with selectively applied vector image data.

Figure 3:
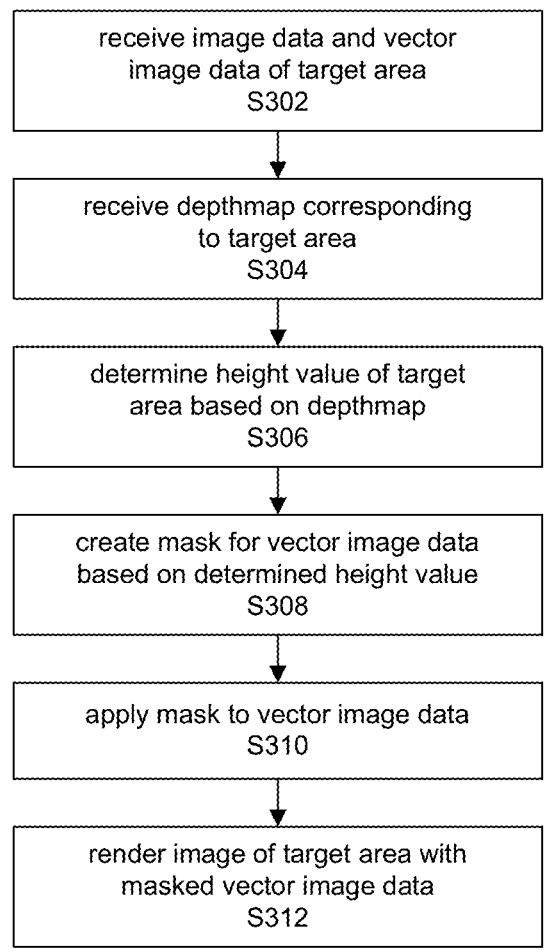
FIG. 3 illustrates an example of a method for rendering a map related image with selectively applied vector image data, in accordance with various aspects of the subject technology.
Figure 4A:
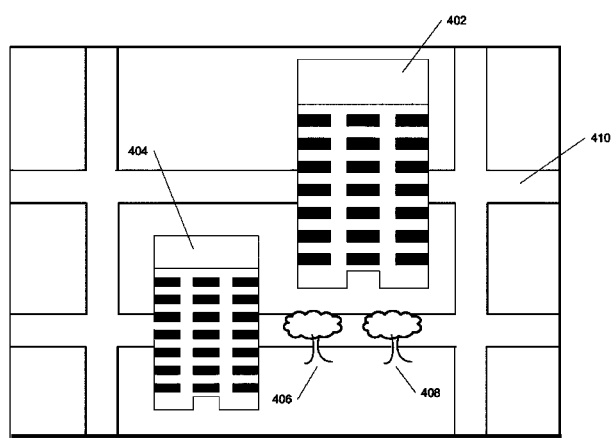
FIG. 4a provides an example illustration of an oblique aerial view image of a target area to which vector image data may be applied, in accordance with various aspects of the subject technology.

FIG. 3 illustrates an example of method 300 for rendering an image related to a map with selectively applied vector image data, in accordance with various aspects of the subject technology. Method 300 may be initiated upon a user selecting a target area in a map to view images corresponding to the target area. Image data of the target area is received from image data repository 102 in block S302. As discussed above, image data may be retrieved by server 104 and served to client device 108. The image data may be representative of an oblique aerial view image of the target area as depicted in FIG. 4a. The oblique aerial view image in FIG. 4a may include imaging of structures in the target area such as buildings 402 and 404 and trees 406 and 408. In some aspects, the oblique aerial view image may include roads 410 as well. While FIG. 3 provides buildings, trees, and roads as structural elements of the target area, any object may be represented in the oblique aerial view image of the target area.

Vector image data of the target area also is received in block S302. Vector image data may include information such as geometrically associated points and lines, which are used to render graphical representations of thoroughfares (e.g., highways, roads, trails, etc.). A thoroughfare may be rendered as a single vector or a combination of several vectors, where each vector represents a segment of the thoroughfare. For example, a linear thoroughfare may be rendered as a single vector starting from a particular point and extending in a direction for a specified distance. A non-linear thoroughfare, on the other hand, may be represented by a combination of connected vectors where each of the combination of vectors start from a particular point and extend in a direction for a specified distance.

Figure 4B:
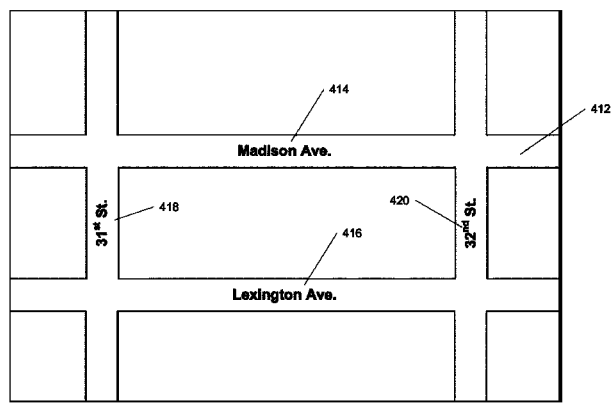
FIG. 4b provides an example illustration of vector image data that may be applied to map related images, in accordance with various aspects of the subject technology.

FIG. 4b illustrates an example graphical representation of roads 412 that may be generated from vector image data. The graphical representation illustrated in FIG. 4b may also include labels 414, 416, 418, and 420, which are also generated from vector image data. Furthermore, as depicted in the relationship between FIGS. 4a and 4b, the graphical representation of roads 412 generated from vector image data in FIG. 4b corresponds to roads 410 depicted in the image shown in FIG. 4a. The graphical representation of roads 412 may be displayed as colored or shaded lines, and may be rendered together with the image shown in FIG. 4a in a mapping application to provide additional information on the target area.

In some aspects, one or more depthmaps associated with the target area are received in block S304. The depthmaps provide 3D information that may be used to generate a mesh model from which height values associated with the target area may be determined in block S306. For example, the one or more depthmaps are used to generate a 3D mesh model, which is used to determine the height values of structures like buildings 402 and 404, and trees 406 and 408. The height values may correspond with respective pixels of the images corresponding to the structures. In other words, each pixel of the rendered image depicted in FIG. 4a may have a corresponding height value relative to a normalized surface of the Earth. For example, the tops of trees 406 and 408 may have a height value of 3 meters, and the top of buildings 404 and 406 may have height values of 30 and 40 meters, respectively. The height values of each of the trees and the buildings gets progressively smaller (i.e., approach 0 meters) towards the base of the structure. For example, when the roof of building 404 has a height value of 30 meters, a pixel representing a location halfway down the face of the building will have a height value of 15 meters. Similar determinations may be made for all other structures in the target area. Furthermore, while this example depicts four structures surrounded by flat surfaces (e.g., the roads and the ground around the buildings), additional structures of varying heights may also be depicted in an image.

A mask for the vector image data is created based on the determined height values in block S308. The mask may be created by determining which pixels of the rendered image have a height value greater than a height value of vector image data (e.g., thoroughfares, labels, etc.) corresponding to the location of the pixel in the image. Applying the mask to the vector image data causes sections of the vector image data to not be shown on the map. Instead, pixels of the image data corresponding to height values greater than a height of the vector image data are displayed.

In some implementations, the map may be normalized in order to remove the effects of elevation changes in the terrain so that the surface of the Earth and the vector image data has a height of 0. Furthermore, the depthmaps may be corrected for terrain (i.e., depthmap values are calculated for the flattened map). Normalizing the map for terrain allows a mask to be created for pixels in the rendered image that correspond to a height value greater than a predetermined value. For example, the mask may be created for all pixels corresponding to a height value greater than 10 meters. Any pixel in the image data having an associated height value greater than the predetermined value is determined to occlude the vector image data, thereby causing the vector image data corresponding to those pixels to be masked. Utilizing a threshold value greater than 0 compensates for noise that may be included in depthmaps and reduces or removes over occlusion of vector image date in the rendered image. The predetermined value may be set or selected based on the elevation and orientation of the image data. For example, as the angle of the point of view approaches an overhead or aerial view, the predetermined value may decrease.

In some implementations, a map inclusive of associated terrain may be used. In order to account for the varying terrain, the height of each vector image data pixel is compared to the corresponding height of the depthmap. A predetermined threshold value may still be used to determine occlusion by comparing the threshold value to difference in the height of each vector image data pixel with the corresponding height of the depthmap.

Figure 4C:
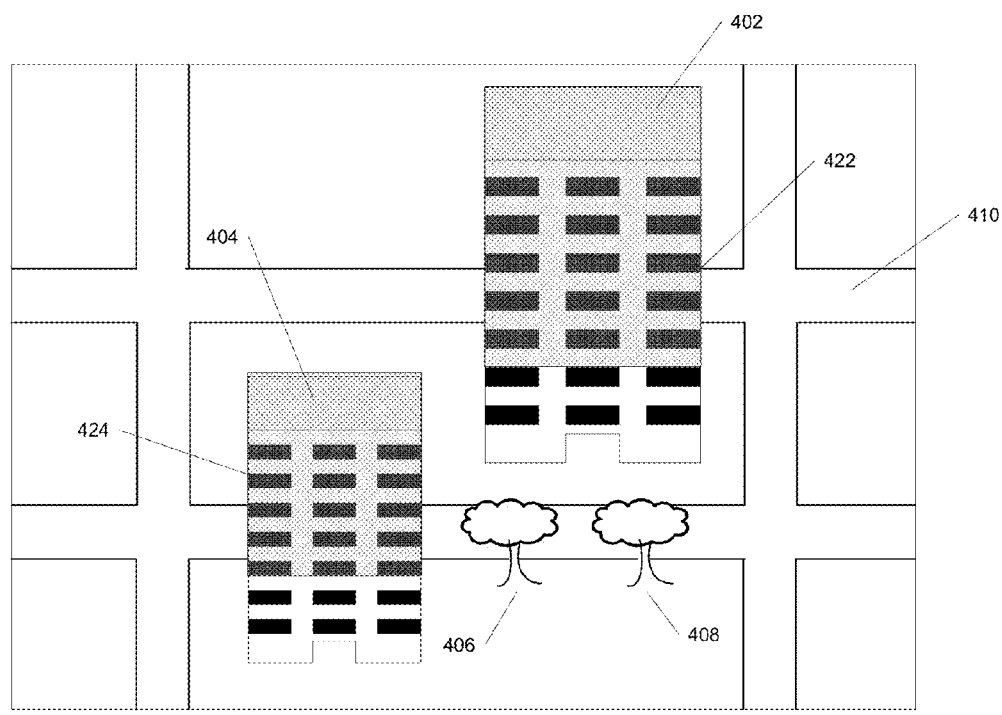
FIG. 4c provides an example illustration of a masked vector image data that may be applied to map related images, in accordance with various aspects of the subject technology.

FIG. 4c provides a conceptual illustration of identifying all pixels of an image that correspond to a height of 10 meters or greater. For example, shaded sections 422 and 424 both represent pixels that correspond to height values of 10 meters or greater. That is, the sections of the building under shaded portions 422 and 424 are at least 10 meters above the normal surface of the Earth. In some implementations, a predetermined height larger or smaller than 10 meters may be used depending on a user's preference in determining the height which occlusion of vector image data may occur.

Figure 4D:
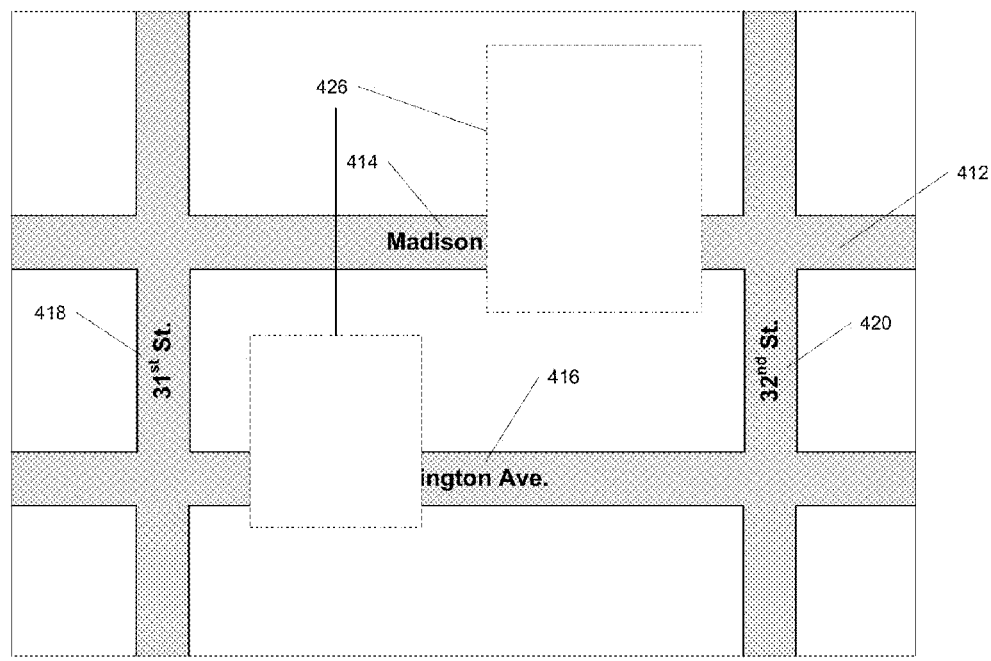
FIG. 4d provides an example illustration of a modified masked vector image data that may be applied to map related images, in accordance with various aspects of the subject technology.

The mask created based on the height values is applied to the vector image data in block S310. FIG. 4d provides a conceptual illustration of applying mask 426 to the vector image data. When applied, mask 426 may omit sections of roads 412 in the graphical representation. Omitting these sections of roads 412 prevents vector image data from being rendered on top of structures in areas where the structure may otherwise occlude the view of the roads in the image. While the current example relates to thoroughfares and vector image data corresponding to thoroughfares, vector image data may include a variety of other forms of structures that a user may like to have occluded by structures represented in an image (e.g., labels of landmarks, etc.).

Figure 4E:
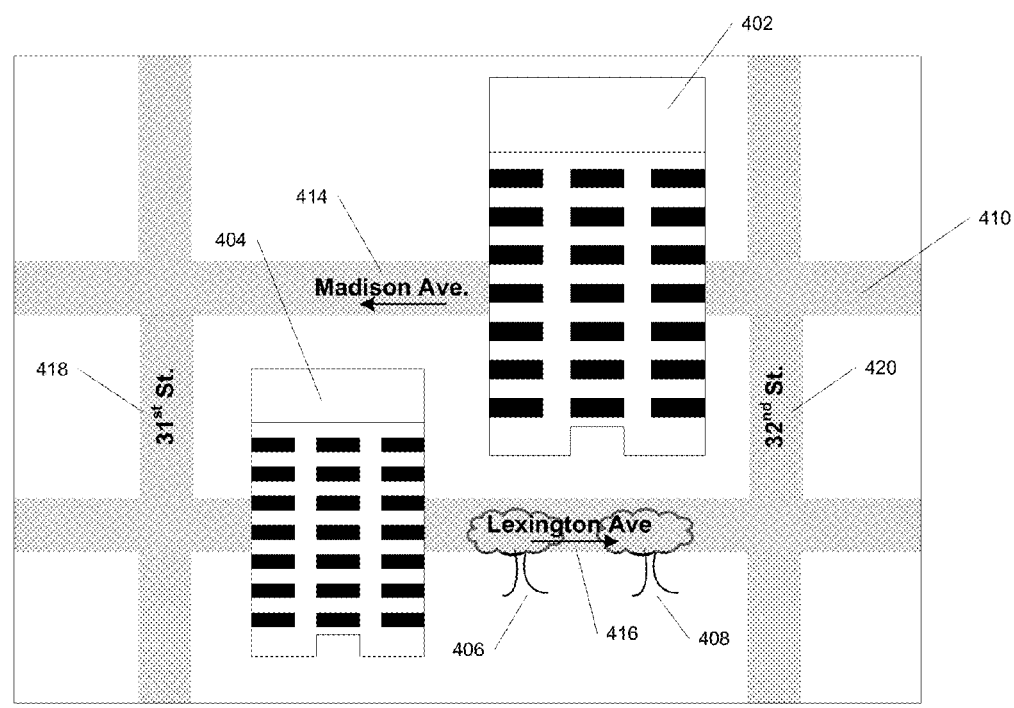
FIG. 4e provides an illustration of a rendered image with selectively applied vector image data, in accordance with various aspects of the subject technology.

In some aspects, the image is rendered by applying the masked vector image data to the map related image in block S312. Vector image data is selectively applied (i.e., certain portions omitted) to provide a more accurate representation in the map related images. FIG. 4e provides an illustrative example of roads 412 generated by vector image data being occluded by buildings 402 and 404. FIG. 4e further illustrates that structures, such as trees 406 and 408, that do not satisfy the predetermined height value will not occlude vector image data in the image. In some implementations, labels derived from vector image data may be displaced such that an occlusion does not cause their omission. For example, street labels 414 and 416 in the example shown in FIG. 4e are displaced to a section along the roads 412 such that the entire label may be visible in the image and thereby maintaining information that may be useful in the rendered image.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
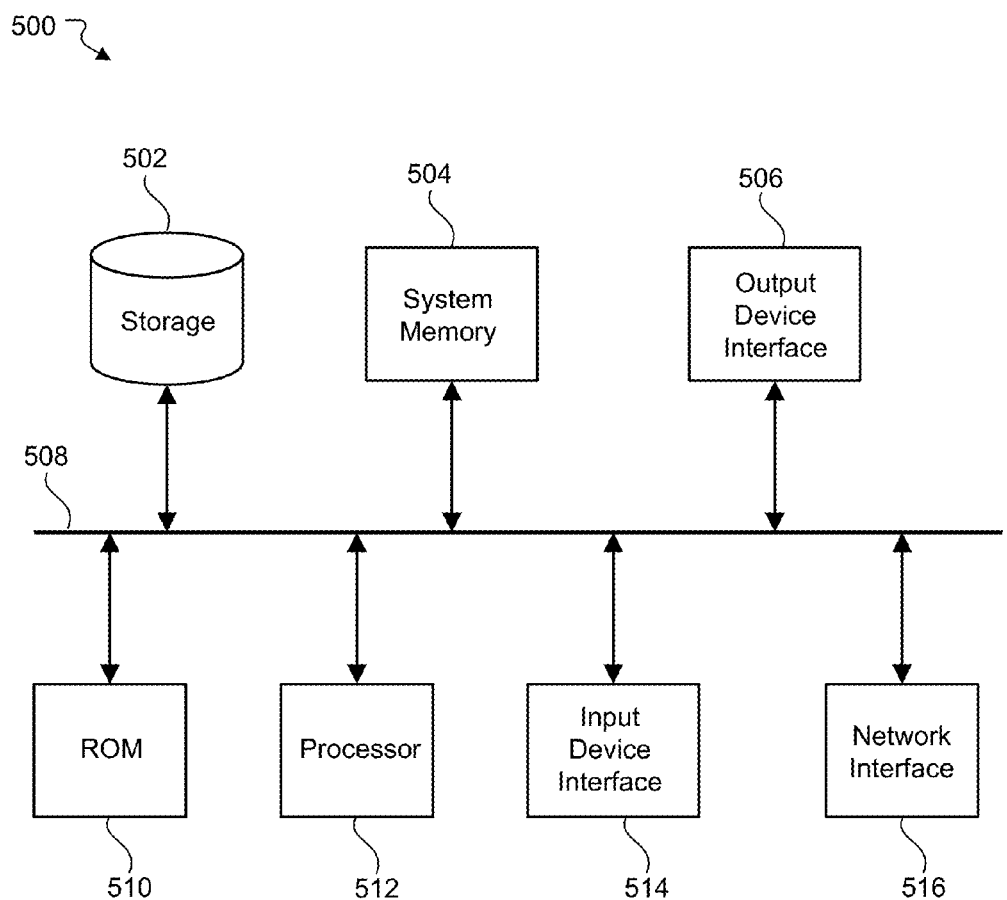
FIG. 5 is a block diagram illustrating components of a computing device, in accordance with various aspects of the subject disclosure.

FIG. 5 conceptually illustrates an example electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for rendering map related images with selectively applied vector image data. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers, such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method of rendering an image related to a target area of a map, the method comprising:
    receiving, by one or more computing devices, image data and an associated depthmap of the target area, the depthmap for determining a height value for each of the plurality of pixels of the image data;
    receiving, by the one or more computing devices, vector image data corresponding to the image data of the target area;
    determining, by the one or more computing devices, the height value for each of the plurality of pixels based on the associated depthmap;
    creating, by the one or more computing devices, a mask based on the determined height value for each of the plurality of pixels of the image data;
    applying, by the one or more computing devices, the mask to the vector image data; and
    providing for display, by the one or more computing devices, an image of the target area comprising the received image data and the masked vector image data.

2. The machine-implemented method of claim 1, wherein the received image data comprises an oblique view image of the target area, and wherein the height value for each of the plurality of pixels of the image data corresponds to an elevation of an object represented by the pixel relative to the surface of the Earth.

3. The machine-implemented method of claim 1, wherein the vector image data corresponding to the image data of the target area, when overlaid on the image data of the target area, provides graphical representations of thoroughfares in the rendered image of the target area.

4. The machine-implemented method of claim 3, wherein the graphical representations of thoroughfares comprise a plurality of lines, each of the plurality of lines corresponding to a respective thoroughfare.

5. The machine-implemented method of claim 4, wherein creating the mask based on the determined height value for each of the plurality of pixels of the image data comprises identifying a set of the plurality of pixels of the image data that have height values greater than a predetermined threshold value, and wherein applying the mask to the vector image data causes sections of the vector image data that correspond to the identified set of the plurality of pixels of the image data to be omitted from the rendered image of the target area.

6. The machine-implemented method of claim 5, wherein the predetermined threshold value is user determined.

7. The machine-implemented method of claim 5, wherein applying the mask to the vector image data comprises changing the transparency of the pixels of the lines of the vector image data corresponding to the identified set of pixels of the mask.

8. The machine-implemented method of claim 7, wherein changing the transparency of the pixels of the lines of the vector image data comprises increasing the transparency to 100%, such that pixels corresponding to the received image data are displayed in areas where the vector image data is masked.

9. The machine-implemented method of claim 7, wherein the vector image data corresponding to the image data of the target area comprises one or more street labels corresponding to the graphical representations of the thoroughfares in the rendered image.

10. The machine-implemented method of claim 9, further comprising displacing the one or more street labels to a portion of the vector image data that does not coincide with the identified set of pixels of the mask when pixels of the one or more street labels corresponding to one of the graphical representations of the thoroughfares in the rendered image coincides with a pixel of the identified set of pixels of the mask.

11. A non-transitory machine-readable medium comprising instructions stored therein, which when executed by a system, cause the system to perform operations comprising:
    receiving an oblique view image associated with a target area of a map and a depthmap associated with the oblique view image, the depthmap for determining a height value of each of a plurality of pixels of the oblique view image;
    receiving vector image data corresponding to the oblique view image, wherein the vector image data provides a graphical representation of thoroughfares;
    determining the height value for each of the plurality of pixels based on the associated depthmap;
    modifying the vector image data based on the determined height value by not displaying pixels from the vector image data corresponding to a set of pixels of the oblique view image determined to have a height value greater than a predetermined threshold value; and
    rendering, for display, an oblique view image of the target area comprising the received oblique view image and the modified vector image data.

12. The non-transitory machine-readable medium of claim 11, wherein the height value for each of the plurality of pixels of the oblique view image corresponds to an elevation of an object relative to a surface of the Earth normalized to eliminate changes in a terrain of the target area.

13. The non-transitory machine-readable medium of claim 11, wherein the vector image data provides graphical representations of thoroughfares on the oblique view image, the graphical representations of thoroughfares comprising a plurality of lines, each of the plurality of lines corresponding to a respective thoroughfare.

14. The non-transitory machine-readable medium of claim 13, wherein the vector image data comprises graphical representations of labels for the oblique view image, the graphical representations of labels comprising text that identify thoroughfares and landmarks on the oblique view image.

15. The non-transitory machine-readable medium of claim 14, further comprising displacing, when a pixel of the graphical representations of labels coincides with pixels from the vector image data that are not displayed, the graphical representations of labels to a portion of the vector image data corresponding to pixels that are displayed.

16. The non-transitory machine-readable medium of claim 11, wherein the predetermined threshold value is user determined.

17. The non-transitory machine-readable medium of claim 11, wherein not displaying pixels from the vector image data corresponding to the set of pixels of the oblique view image determined to have a height value over a predetermined threshold value provides for a display of the received oblique view image when overlaid with the modified vector image data.

18. A system for rendering an image related to a map with selectively applied vector image data, the system comprising:
   one or more processors; and
   a machine-readable medium comprising instructions stored therein, which when executed by the processors, cause the processors to perform operations comprising:
      receiving image data and an associated depthmap of a target area;
      receiving vector image data corresponding to the image data of the target area, the depthmap for determining a height value for each of a plurality of pixels of the image data;
      determining the height value for each of the plurality of pixels of the image data based on the associated depthmap;
      modifying the vector image data based on the determined height value by omitting display of pixels of the vector image data corresponding to a set of pixels of the image data determined to have a height value greater than a predetermined threshold value;
      overlaying the image data of the target area with the modified vector image data; and
      providing for display of the image data with the overlaid modified vector image data.

19. The system of claim 18, wherein the height value for each of the plurality of pixels of the image data corresponds to an elevation of an object in the target area relative to a normalized surface of the Earth.

20. The system of claim 18, wherein the vector image data provides graphical representations of thoroughfares on an oblique view image, the graphical representations of thoroughfares comprising a plurality of lines, each of the plurality of lines corresponding to a respective thoroughfare.

* * * * *